3,387,980
HEAT RESISTANT INORGANIC BODIES

James T. Trainor, Stamford, and Edward R. Kaufman, Stratford, Conn., assignors to Raybestos-Manhattan, Inc., Bridgeport, Conn., a corporation of New Jersey
No Drawing. Filed Apr. 7, 1965, Ser. No. 446,404
7 Claims. (Cl. 106—15)

ABSTRACT OF THE DISCLOSURE

Production of a heat resistant inorganic reaction product comprising chrysotile asbestos and phosphoryl triamide.

---

This invention relates to the production of heat resistant inorganic products characterized by the molding under heat and pressure of inorganic materials with phosphoramide (also known as phosphoryl triamide) or tractable polymers thereof as a binder, and whereby said binder is caused to flow and gel and is converted to its thermal polymers, and if desired, ultimately to materials approaching the theoretical value corresponding to the formation of phosphorus oxynitride.

It is well known that on heating phosphoramide is converted to a series of increasingly insoluble and higher molecular weight polymers. If heated at 600° C. phosphorus oxynitride can be formed. It is further known that phosphonitrilic chlorides react with metal oxides to give phosphorus oxynitride and the corresponding metal halide.

The present invention is distinct from and offers advantages over prior methods of preparing heat resistant materials from phosphonitrilic chlorides and metal oxides. For certain uses it is unnecessary or undesirable to carry the polymerization of phosphoramide to a stage where the composition of the binder approaches phosphorus oxynitride. When this is the case the binder is proposed to consist mainly of phosphoryl imidoamide polymers or depending on extent of previous heating, polymers intermediate between the above and phosphorus oxynitride.

The advantages of the present invention over prior practices include the capability of using the monomer or tractable polymer either as dry powders or as solutions in appropriate solvents such as water. Aqueous solutions have been demonstrated to be of sufficient stability to be practical. In addition the only by-products produced during the thermal polymerization of the phosphoramide or polymers derived from it are volatile at room temperature and as such do not remain as a potentially undesirable contaminant in the finished article. A further advantage lies in the fact that the violently exothermic reaction such as described on mixing polymeric phosphonitrilic chlorides and metal oxides does not occur with the present system.

In carrying out the present invention the phosphoramide or a tractable polymer derived from it are combined with a body of inorganic material such as filler particles and/or reinforcing fibers either in a dry or wet mix, or by standard saturating procedures. The preferred proportions of binder, filler and fiber will of course vary with specific applications, however, in general the acceptable limits of the initial percentage of binder can range from about 15 to about 60% by volume. When wet mixes or saturating procedures are used the material is subjected to a low temperature dry-out to reduce volatile content before the molding or pressing operation. The molding compounds or saturated sheets are heated under pressure at a temperature sufficient to cause the binder to flow and gel.

In general the pressing or molding temperature can be at least as high as 650° F. although a range of 400–500° F. is preferable. Appreciable binder flow occurs during the initial stage of the pressing cycle and the evolution of ammonia vapor can be detected.

After removal from the press the laminate or molded article, can be subjected to additional heat aging at temperatures up to 1150° F. The preferred temperature is dependent on ultimate use temperatures as well as on the nature of other materials present. In general temperatures of 700–900° F. are satisfactory.

As a class the products of this invention are hard, dense, and resistant to oxidative, thermal or hydrolytic degradation. They are suited for use as thermal and electrical insulators, friction or bearing materials, or abrasive elements. It is understood that the performance characteristics of the products of this invention with regard to specific applications can be altered by the appropriate selection of fillers and reinforcing fibers.

The reinforcing fibers employed are heat resistant inorganic materials such as glass, mineral wool or asbestos either alone or in admixture and in the form of loose fibrous bodies or as carded or woven fabrics, and in the preferred practices of the present invention the inorganic material, other than the binder, is in whole or in part composed of asbestos.

It is suggested that there can occur, during the thermal polymerization, a degree of reaction between the binder and the filler, particularly in the case of asbestos. However, the description of such reactions is not fully understood at present.

Thus, in the production of automotive and industrial friction materials such as brake linings and clutch facings, they may be formed wholly of asbestos fibers and the aforesaid phosphoramide binders, but desirably include inert filler particle material and friction augmenting agents such as barytes, litharge, graphite, chips of metals such as copper, lead, tin or iron, magnesium and zinc oxides, and other similar well known components. Abrasive wheels can include abrasive particles such as silica, aluminum oxide, silicon carbide and the like, with or without asbestos fibers.

The following are examples of practice of this invention for the purpose of illustration and not limitation:

EXAMPLE I

A mixture of 40 gms. of phosphoramide and 60 gms. of chrysotile asbestos fiber were blended into a uniform dry molding compound. This compound was compression molded at 460–470° F. and 3000 p.s.i. for one hour. The hard, molded panel had a density of 2.06 g./cc. After heat aging up to 650° F. the panel had a hardness on the Brinell scale of 8 and a density of 1.98 g./cc. Additional heat aging to 875° F. resulted in a total weight loss closely approaching the theoretical value corresponding to the formation of phosphorus oxynitride, and a product of hard and uniform character having excellent strength.

EXAMPLE II

A solution of 50 gms. of phosphoramide in 150 ml. of water was used to saturate asbestos felt sheets. The saturated sheets were briefly dried at 150° F. to remove excess water. The binder content as calculated from the dry weight of the saturated felts was 47%. A 58 ply laminate was molded as described in Exeample I. A strong, hard laminate was obtained with a final binder content of 28 percent.

Although we have shown and described the preferred embodiment of our invention it will be understood by those skilled in the art that changes may be made in the details thereof without departing from its scope as comprehended by the following claims.

We claim:
1. The method of making a heat resistance inorganic composition which comprises admixing a body of chrysotile asbestos material with phosphoryl triamide as a binder and reacting them by subjecting them to consolidating pressure of 3,000 pounds per square inch for one hour at a binder flowing and gelling temperature, said binder consisting of from about 15 to about 60% by volume of said composition at a temperature of from about 400° to about 500° F.

2. The method of making a heat resistant inorganic composition which comprises admixing chrysotile asbestos fibers with phosphoryl triamide as a binder and reacting them by subjecting them to consolidating pressure of 3,000 pounds per square inch for one hour at a binder flowing and gelling temperature of from about 400° F. to about 650° F., said binder consisting of from about 15% to about 60% by volume of said composition.

3. The method of making a heat resistant inorganic composition which comprises admixing chrysotile asbestos fibers with phosphoryl triamide as a binder and reacting them by subjecting them first to consolidating pressure of 3,000 pounds per square inch for one hour at a binder flowing and gelling temperature of from about 400° F. to about 650° F., and then to aging at a temperature of from about 700° F. to about 1150° F., said binder consisting of from about 15% to about 60% by volume of said composition.

4. The method of making a heat resistance inorganic composition which comprises admixing a body of fibrous chrysotile asbestos and inorganic inert filler material particles with phosphoryl triamide as a binder and subjecting them to consolidating pressure of 3,000 pounds per square inch for one hour at a binder flowing and gelling temperature of from about 400° to about 650° F., said binder consisting of from about 15% to about 60% by volume of said composition.

5. The method of making a heat resistant inorganic composition which comprises admixing a body of inorganic material consisting essentially of chrysotile asbestos with powdered phosphorus triamide and reacting them by subjecting them to consolidating pressure of 3,000 pounds per square inch for one hour at a binder flowing, gelling and thermal polymerizing temperature of from about 400° to about 650° F., said binder consisting of from about 15% to about 60% by volume of said composition.

6. The method of making a heat resistant inorganic composition which comprises admixing a body of inorganic material consisting essentially of chrysotile asbestos with an aqueous solution of phosphoryl triamide as a binder and subjecting them to consolidating pressure of 3,000 pounds per square inch for one hour at a binder flowing, gelling and thermal polymerizing temperature of from about 400° to about 650° F., said binder consisting of from about 15% to about 60% by volume of said composition.

7. A moulded heat resistant inorganic composition which comprises the reaction product of chrysotile asbestos and as a binder phosphoryl triamide, said binder consisting of from about 15% to about 60% by volume of said composition.

References Cited
UNITED STATES PATENTS

| | | | |
|---|---|---|---|
| 2,680,077 | 6/1954 | Nielson et al. | 106—15 |
| 2,788,286 | 4/1957 | Teja et al. | 106—286 |
| 3,029,283 | 4/1962 | Steinhauer | 106—15 |
| 3,146,228 | 8/1964 | Chance | 106—15 |
| 3,164,556 | 1/1965 | Apley et al. | 260—37 |
| 3,179,489 | 4/1965 | Becke | 106—15 |
| 3,206,494 | 9/1965 | Lund et al. | 106—15 |

JAMES A. SEIDLECK, *Primary Examiner.*

J. B. EVANS, *Assistant Examiner.*